United States Patent
Couch et al.

(10) Patent No.: US 11,189,199 B2
(45) Date of Patent: Nov. 30, 2021

(54) LIGHT EMISSIVE DISPLAYS COMPRISING OVERPRINT VARNISHES

(71) Applicant: SUN CHEMICAL CORPORATION, Parsippany, NJ (US)

(72) Inventors: Erick Couch, Santa Barbara, CA (US); Andrew M. Bakaysza, Rohnert Park, CA (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/045,572

(22) PCT Filed: Jun. 24, 2019

(86) PCT No.: PCT/US2019/038654
§ 371 (c)(1),
(2) Date: Oct. 6, 2020

(87) PCT Pub. No.: WO2020/005800
PCT Pub. Date: Jan. 2, 2020

(65) Prior Publication Data
US 2021/0027675 A1    Jan. 28, 2021

Related U.S. Application Data

(60) Provisional application No. 62/689,468, filed on Jun. 25, 2018.

(51) Int. Cl.
*G09F 13/20*    (2006.01)
*F21V 8/00*    (2006.01)

(52) U.S. Cl.
CPC ............. *G09F 13/20* (2013.01); *G02B 6/006* (2013.01); *G02B 6/0013* (2013.01); *G02B 6/0035* (2013.01); *G02B 6/0068* (2013.01)

(58) Field of Classification Search
CPC ....... G09F 13/20; G02B 6/0013; G02B 6/006; G02B 6/0035
See application file for complete search history.

(56) References Cited

U.S. PATENT DOCUMENTS

| | | | |
|---|---|---|---|
| 10,182,702 B2 * | 1/2019 | Nagao | G02B 6/0038 |
| 10,600,939 B2 * | 3/2020 | Yuan | B41F 15/00 |
| 2007/0031097 A1 | 2/2007 | Heikenfeld | |
| 2014/0233879 A1 | 8/2014 | Gibson et al. | |
| 2016/0231491 A1 | 11/2016 | Couch | |
| 2017/0115443 A1 | 4/2017 | Couch | |

(Continued)

OTHER PUBLICATIONS

International Search Report issued in International Application No. PCT/US2019/038654, dated Jun. 26, 2019.

(Continued)

*Primary Examiner* — Sung H Pak
(74) *Attorney, Agent, or Firm* — Marian E. Fundytus; Ostrolenk Faber LLP.

(57) ABSTRACT

The present invention comprises a light emissive display comprising one or more photoluminescent printed waveguides. The waveguides are coated with one or more layers of an overprint varnish. The overprint varnish eliminates surface texture produced by the photoluminescent printing, rendering the waveguides transparent when in the non-energized state.

13 Claims, 14 Drawing Sheets

(56) References Cited

U.S. PATENT DOCUMENTS

2018/0059318 A1 3/2018 Nichol
2018/0156957 A1 6/2018 Larsen

OTHER PUBLICATIONS

Written Opinion of the International Searching Authority issued in International Application No. PCT/US2019/038654, dated Jun. 26, 2019.
International Preliminary Report on Patentability (Chapter II of the Patent Cooperation Treaty) issued in International Application No. PCT/US2019/038654, dated Aug. 12, 2020.

* cited by examiner

Figure 2
a)
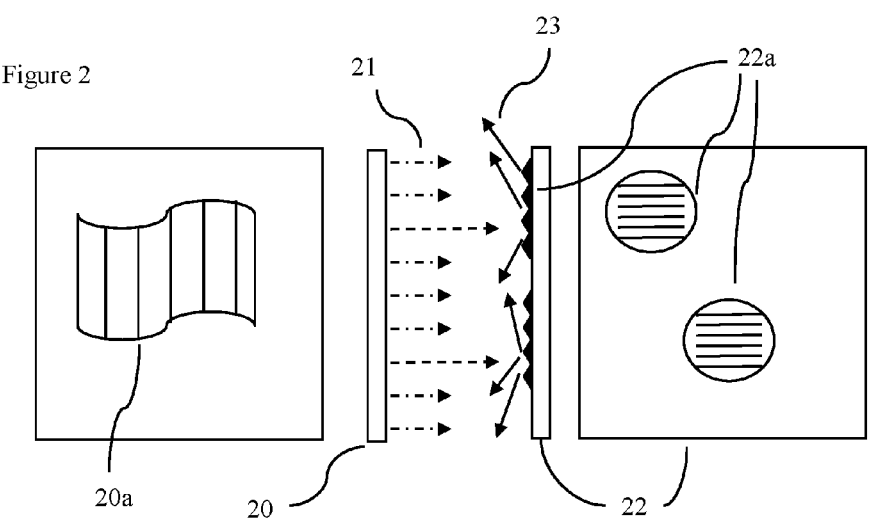
b)
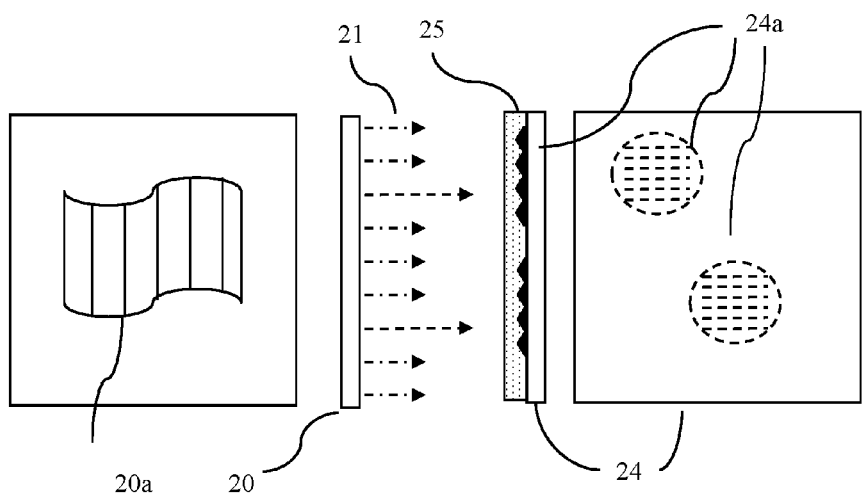

Figure 5
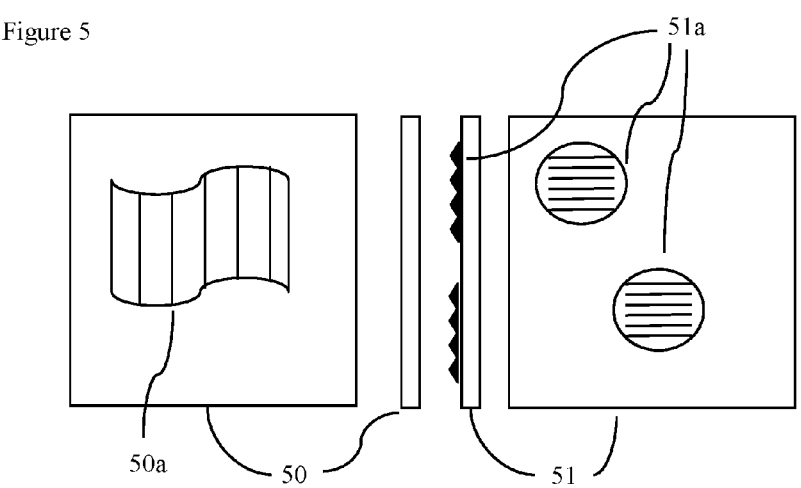
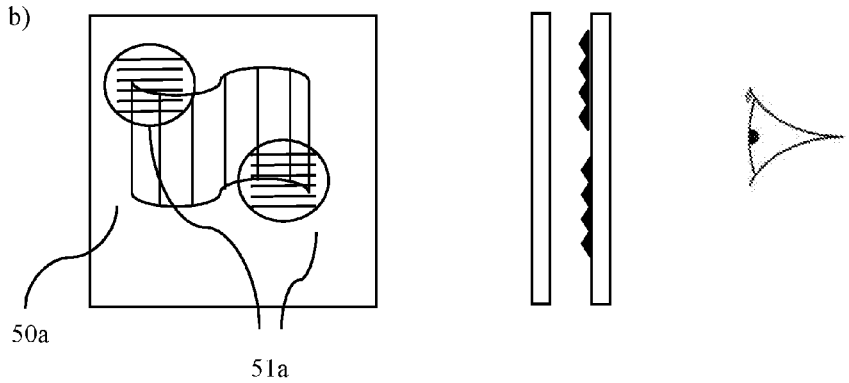

Figure 6
a)
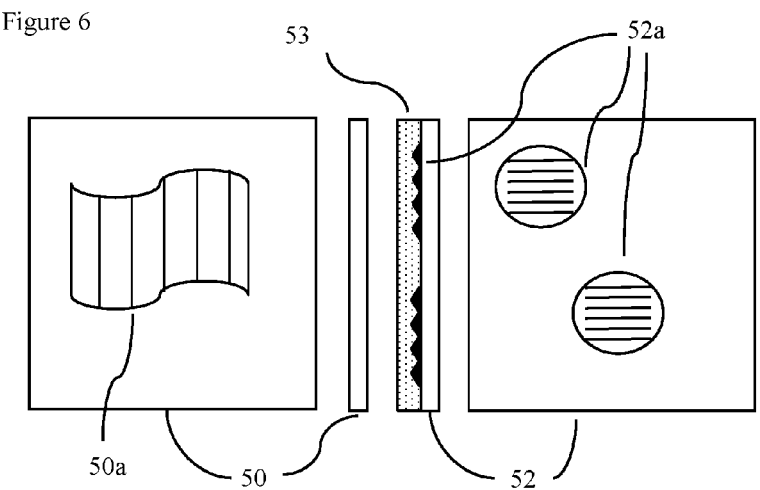
b)
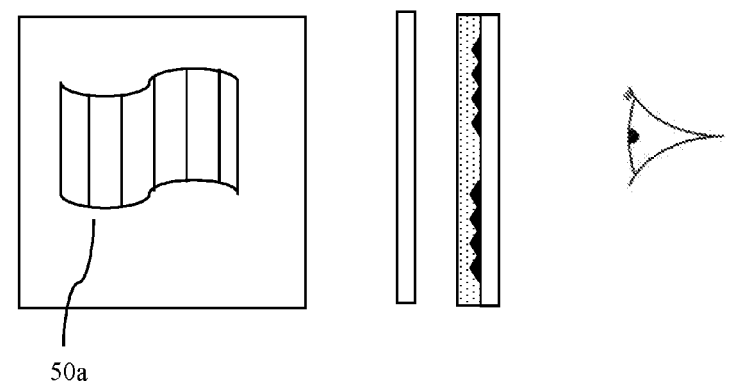

Figure 10
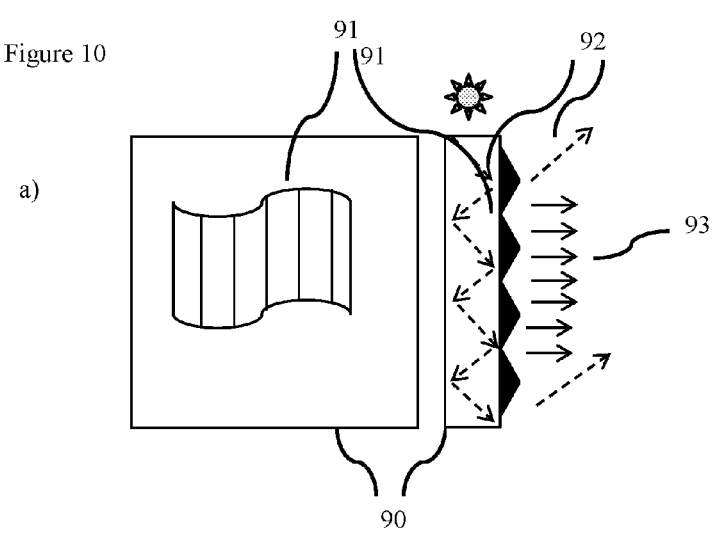
a)
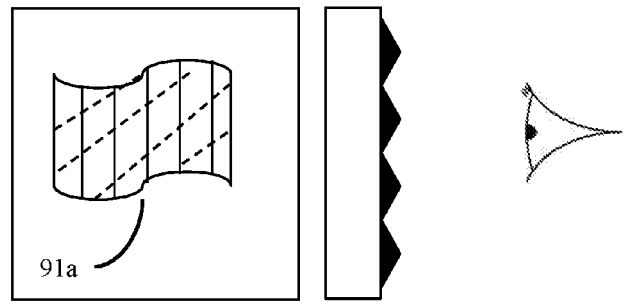
b)

Figure 11
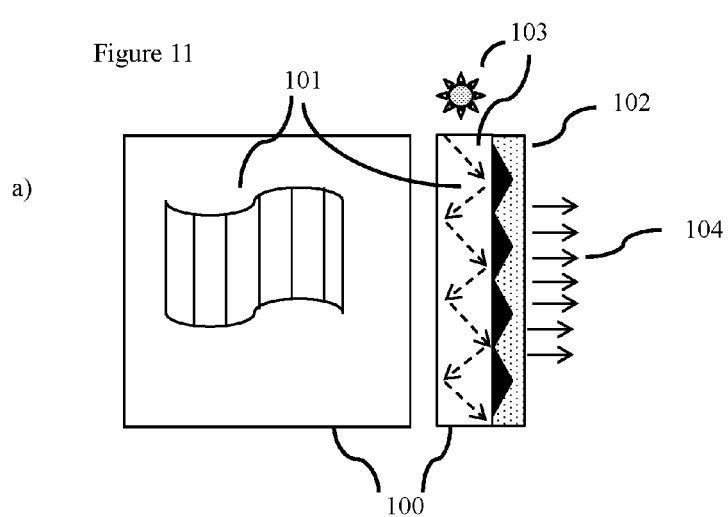
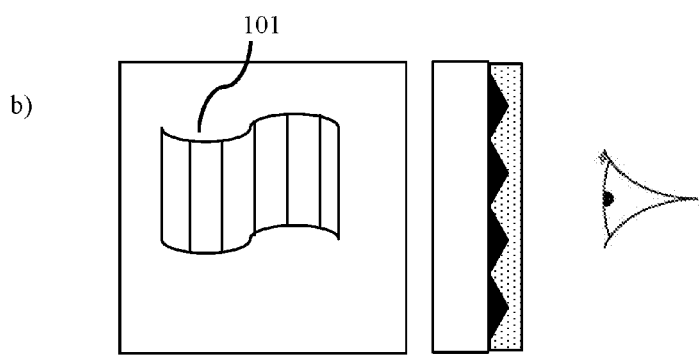

LIGHT EMISSIVE DISPLAYS COMPRISING OVERPRINT VARNISHES

CROSS REFERENCE TO RELATED APPLICATIONS

The present application is a § 371 National Phase application based on PCT/US2019/038654 filed Jun. 24, 2019, which claims the benefit of U.S. Provisional Application No. 62/689,468, filed Jun. 25, 2018 the subject matter of each of which is incorporated by reference in their entirety.

FIELD OF THE INVENTION

The present invention relates to light emissive displays, based upon lightwave coupling. For example, the present invention is related to light emissive signage devices.

BACKGROUND OF THE INVENTION

Photoluminescent printed waveguides can be produced using various photoluminescent colorants which are transparent when non-energized, yet emit color when subjected to ultra-violet, violet, or blue light energy (generally in the range of 350-450 nm). By printing on clear waveguides, multiple waveguide layers can be stacked and alternately energized to produce engaging motion effects. This technology has the benefit over competing technologies such as LCD in that it is a low-cost printed approach which can be produced in sizes and shapes other than the standard ratio rectangular LCD products. Unlike LCDs, it can also be contour cut or 3D formed. However, currently available products have problems.

U.S. Pat. No. 7,430,355 discloses a signage device comprising one or more light sources, a waveguide or arrangement of waveguides, and photoluminescent features coupled thereto. U.S. Pat. No. 10,181,274 discloses a remotely positioned light source configured to produce ultra-violet, violet, or blue light, a first and second waveguide, and a propagation direction changing feature. US 2016/0231491 discloses a display with a first emissive image and a second image. The display includes a waveguide that includes an image formed from photoluminescent dyes on a surface of the waveguide which is activated by a first light source. A second light source behind said waveguide produces a second image A light filter is positioned between the waveguide and the second light source.

US 2007/0031097 teaches that it is desirable for either the upper or lower surfaces, or both, of a photoluminescent layer be textured. Several methods to produce a scattering layer are disclosed.

US 2014/0233879 discloses a reflective display using stacked luminescent waveguides. The luminophores are dispersed within the waveguide material (e.g. a polymer with a colorant dispersed therein).

There remains a need for light emissive displays wherein the printed photoluminescent waveguides are fully transparent when in the non-energized state

SUMMARY OF THE INVENTION

The present invention provides a display comprising:
a) one or more waveguides, each waveguide independently having a photoluminescent image printed thereon;
b) one or more short wavelength light sources emitting excitation light, having a wavelength less than 450 nm, wherein each light source is associated with one waveguide, and adapted to transmit light through said waveguide, causing the photoluminescent image to emit visible light;
wherein each waveguide comprises one or more layers of overprint varnish (OPV).

In certain embodiments the OPV reduces the surface texture of printed waveguides. Reduction of surface texture ameliorates unwanted scattering of light. In other embodiments, the OPV provides a water clear transparency such that the result approaches the transparency of the unprinted waveguide.

The present invention also provides a method of reducing the surface texture of a photoluminescent printed waveguide, thereby rendering the waveguide transparent.

These and other objects, advantages, and features of the invention will become apparent to those persons skilled in the art upon reading the details of the compositions and methods as more fully described below.

BRIEF DESCRIPTION OF THE DRAWINGS

FIG. 1 is an illustration of a light emissive display comprising a non-energized waveguide, with and without OPV, illuminated by ambient light.

FIG. 2: FIG. 2 is an illustration of an illuminated translite behind a non-energized photoluminescent printed waveguide with and without OPV.

FIG. 3 is an illustration of an illuminated object behind a non-energized photoluminescent printed waveguide with and without OPV.

FIG. 4 is an illustration of a background pattern behind a printed photoluminescent waveguide.

FIG. 5: FIG. 5 is an illustration of an illuminated translite behind a photoluminescent printed waveguide that is not coated with an OPV.

FIG. 6: FIG. 6 is an illustration of an illuminated translite behind a photoluminescent printed waveguide coated with an OPV.

FIG. 7 is an illustration of a box containing an illuminated object, and a photoluminescent printed waveguide in front of the illuminated object.

FIG. 8 is an illustration of total internal reflection within a waveguide.

FIG. 9 is an illustration of a photoluminescent printed waveguide without OPV (9a) having unsymmetrical surface geometry at the borders of the printed and unprinted portions of the waveguide; and a photoluminescent printed waveguide coated with OPV (9b) having a smooth surface, and no discernible change in surface geometry at the borders of the printed and unprinted portions of the waveguide.

FIG. 10: FIG. 10 is an illustration of high angle color shift produced by a photoluminescent printed waveguide not coated with OPV.

FIG. 11: FIG. 11 is an illustration of the absence of high angle color shift by a photoluminescent printed waveguide coated with OPV.

FIG. 12 is an illustration of the clarity of text behind a film, not coated with OPV, and coated with OPV.

FIG. 13 is an illustration of an illuminated object posterior to two photoluminescent printed waveguides, wherein the waveguides are either not coated with OPV or are coated with OPV.

FIG. 14 is an illustration of an OPV on a thermoformed waveguide.

DETAILED DESCRIPTION OF THE INVENTION

Figure 1:
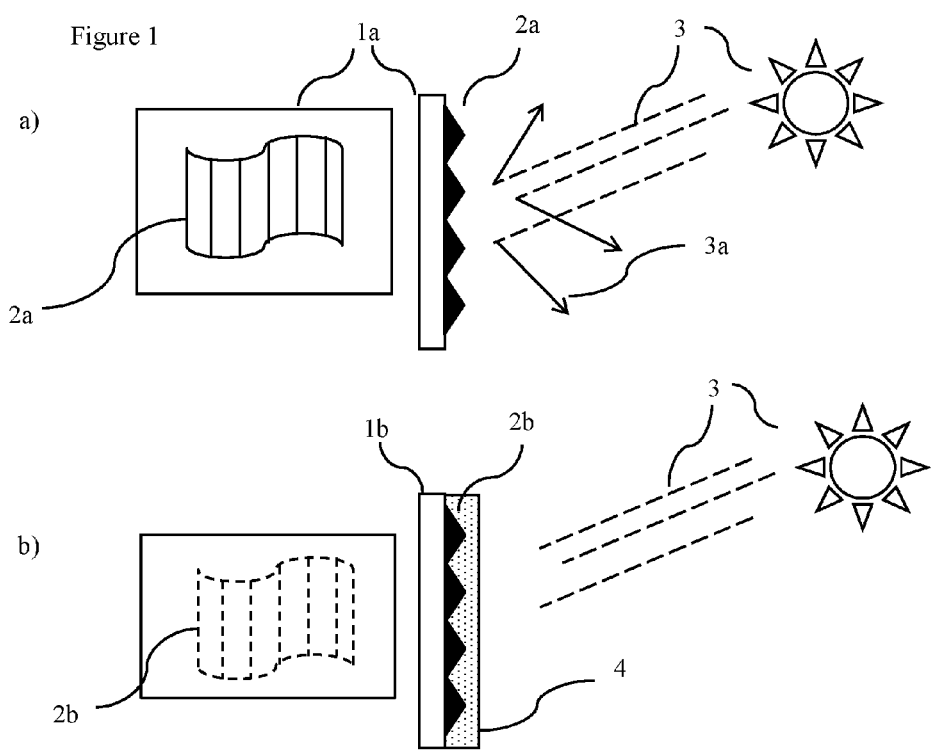
FIG. 1.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

The present invention provides a light emissive display system comprising one or more photoluminescent printed waveguides based on lightwave coupling. The photoluminescent printing may be directly onto the waveguide, or it may be printed onto a film coupled to the waveguide The photoluminescent printed waveguide(s) are illuminated by one or more remotely positioned light sources, emitting short wavelength excitation light, preferably less than 450 nm. For example, the excitation light may be about 350 nm to 450 nm, such as in the ultra-violet, violet, or blue light range. The excitation light is confined to the waveguide via total internal reflection (TIR). When illuminated by the short wavelength light, the photoluminescent inks are excited, and emit visible light of the desired color, so that the photoluminescent printed image is visible in the display. In a preferred embodiment, each waveguide has a separate light source. Each waveguide may be edgelit by a light source positioned next to one edge of the waveguide. In currently available light emissive displays, the photoluminescent printing creates a surface texture, and the waveguide is not transparent, resulting in a hazy appearance, when the waveguide is not energized. Applying the OPV according to the present invention eliminates the surface texture, and the waveguide is transparent when not energized.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, when a photoluminescent image is "optically coupled" to a waveguide, it can either be printed directed onto the waveguide, or it can be printed onto a flexible film or rigid substrate which is coupled to the waveguide.

As used herein, when a flexible film or rigid substrate is "coupled" to the waveguide, it means that it is attached to the waveguide, such as by lamination.

As used herein, the photoluminescent printed image may include one or more of emissive images, lines of text, and graphic elements, alone or in combinations of two or more.

As used herein, "waveguide" refers to any suitable optically transparent material, capable of propagating short wavelength (e.g. less than 450 nm, such as ultra-violet, violet and blue light), and with a refractive index higher than the refractive index of an environment surrounding the waveguide. Refractive index of the waveguide must be higher than the surrounding environment so that TIR is maintained within the waveguide (i.e. the waveguide is the first medium and the surrounding environment is the second medium).

As used herein, "thermoformable" refers to a property of a product, such as an overprint varnish (OPV), ink or coating, whereby the product can be heated and shaped (elongated), with little or no compromise of its structural integrity or functionality.

As used herein, "refractive index" is the ratio of the speed of light in one medium (e.g. a vacuum) versus the speed of light in a denser medium. Refractive index is an indication of how much light will bend, or refract, when passing from one medium into another medium.

As used herein, "total internal reflectance" or "TIR" is the complete reflection of a ray of light within a medium (e.g. waveguide substrate) from the surrounding surfaces back into the medium.

As used herein, a waveguide is "energized" when it is illuminated by a remote light source emitting short wavelength light (e.g. less than 450 nm). The terms "energized" and "illuminated" are used interchangeably. Similarly, the terms "non-energized" and "non-illuminated" are used interchangeably.

As used herein, the term "substantially transparent" means that at least 70% of light in the visible wavelength range is transmitted therethrough. For example, at least 75%, at least 80%, at least 85%, at least 90%, at least 95%, or at least 100% of light in the visible wavelength range is transmitted therethrough. In preferred embodiments, at least 80% of light in the visible wavelength range is transmitted.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source, or other source of actinic radiation, may be used to cure compositions prepared according to the current invention. An "energy curable" ink or coating is one that is cured by energy curing.

Light Emissive Display with Overprint Varnish

The present invention provides light emissive displays comprising one or more clear waveguides, one or more of which each independently comprise a photoluminescent image. Each waveguide is independently illuminated by a remote light source, emitting short wavelength excitation light that is less than about 450 nm. The excitation light may be about 350 nm to about 450 nm. For example, the excitation light may be in the ultra-violet, violet, or blue range. The photoluminescent inks are designed to be transparent when in the non-energized state. However, the photoluminescent ink layer(s) typically add a surface texture to the waveguide, and the waveguide and image are not fully transparent when in the non-energized state. Other detrimental effects are also associated with the surface texture produced by the photoluminescent printed inks. According to the present invention, one or more of the waveguides is coated with an overprint varnish (OPV). The OPV reduces or eliminates the surface texture of the waveguide. Thus, the present invention provides light emissive displays having improved transparency of photoluminescent images that are printed on or coupled to waveguides, thereby eliminating many of the disadvantages of currently available light emissive displays.

Light emissive displays of the invention comprise one or more waveguides based on light wave coupling technology. A waveguide can be of any suitable optically transparent material, capable of propagating short wavelength light (e.g. less than 450 nm, such as ultra-violet, violet and blue light), and with a refractive index higher than the refractive index of an environment surrounding the waveguide. Refractive index of the waveguide must be higher than the surrounding environment so that TIR is maintained within the waveguide (i.e. the waveguide is the first medium and the surrounding environment is the second medium). A surrounding environment could be a gas or a vacuum, having a refractive index of about 1.0, or an environment with a slightly higher index, for example a low index liquid, such as water or other optical fluids, typically having refractive indices of about 1.3 to 1.4. Suitable materials for constructing a waveguide include, but are not limited to, silicon nitride ($Si_3N_4$), silicon oxynitride (SiON), borosilicate glass, aluminosilicate glass, float glass, and other suitable materials. Suitable waveguide materials typically have a refractive index of higher than 1.0. The front of the display may be a waveguide. Alternatively, the front layer of the display may be a transparent medium, such as plastic or glass, for example clear acrylic. The transparent medium should have no texture in the unprinted state. Although most materials have some inherent flaws due to production processes, in common terms it is sufficiently clear to the unaided eye, and appears transparent.

Figure 8:
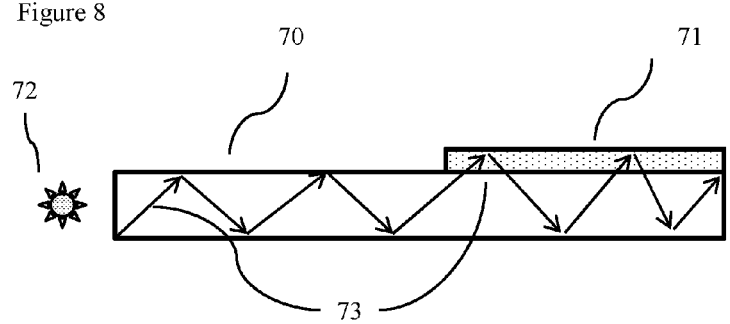
FIG. 8.

Each waveguide is independently illuminated by a remote light source, emitting short wavelength excitation light that is less than about 450 nm. The excitation light may be about 350 nm to about 450 nm, preferably about 380 nm to about 420 nm. For example, the excitation light may be in the ultra-violet, violet, or blue range. Emissive photoluminescent printed waveguides dependent on total internal reflection (TIR) which convert incident energy of one wavelength to emissive color consume available excitation energy according to the quantity and location of printed photoluminescent phosphors. Any overprint varnish that interrupts total internal reflection, causing the excitation energy to exit the waveguide surface, is undesirable as it subjects viewers to violet, ultraviolet, or blue light energy and it reduces available light for exciting the intended photoluminescent content. If the excitation light includes visible light, this also reduces contrast and degrades photoluminescent layer effectiveness. Advantageously, the OPV of the present invention does not interrupt TIR. Thus, it is a preferred embodiment of the present invention that the OPV does not interrupt the TIR of light. To maintain TIR of the excitation within the waveguide, the refractive index of the OPV is advantageously less than or equal to the refractive index of the waveguide material. This is illustrated in FIG. 8. FIG. 8 shows a waveguide 70, illuminated by a remote light source 72. A portion of waveguide 70 is coated with OPV 71. Excitation light 73 (arrows) reflects within the waveguide (i.e. light does not escape the waveguide). OPV 71 maintains the total internal reflection of excitation light 73, so that light does not escape the waveguide 70 even in the portion coated with OPV 71. Total internal reflection is maintained, and maximized, by matching the refractive index of the OPV to the refractive index of the waveguide material.

Suitable photoluminescent dyes include, but are not limited to, coumarins, stilbenes, rhodamines, perylenes, cyanines, and other common fluorescent dyes, such as laser dyes, dispersed in a polymer matrix. Suitable photoluminescent materials include, but are not limited to, ruthenium-based dyes, potassium ferricyanide, ferric ammonium citrate, potassium dichromate, rhodamine type dyes (e.g. tetraethyl rhodamine (Rhodamine B)), sodium p-dimethylamine-azobenzenesulfonate (methyl orange), 3,7-bis(dimethylamino)phenazathionium chloride (methylene blue), ammonium dichromate, pyridine dichromate, fluorosceins and halogenated derivatives thereof (e.g. tetraiodofluorescein, tetrabromofluorescien, diiodoeosine, tetrabromodhchlorofluorescein), cyanines (e.g. 1,1'-diethyl-4,4'-cyanine iodide (cyanine blue); 1,1'-diethyl-2,4-cyanine iodide (ethyl red); 1,1'-diethyl-2,2'-carbocyanine iodide (pinacyanol); 1,1'-diethyl-4,4'-carbocyanine iodide (Kryptocyanine)), combinations thereof, and the like.

Emissive photoluminescent printed waveguides which are intended to alternately become transparent are often printed using processes that create surface texture. The surface texture results in many undesired effects. An overprint varnish (OPV) is applied over the photoluminescent printing on each of the one or more waveguides. The OPV reduces the surface texture of the printed waveguide, so that the waveguide with the photoluminescent printing is transparent when non-illuminated.

This surface texture scatters ambient light even when the waveguide is non-energized, thus reducing transparency. FIG. 1 depicts this phenomenon. FIG. 1a illustrates a non-energized waveguide 1a, having a photoluminescent image 2a printed thereon. The waveguide 1a is illuminated by ambient light 3. The surface texture produced by the photoluminescent printing scatters ambient light 3a. Photoluminescent image 2a is visible (indicated by solid line outline), as a faint ghost image, even when the waveguide 1a is in the non-energized state. FIG. 1b illustrates a non-energized waveguide 1b, having a photoluminescent image 2b printed thereon, and further coated with an OPV 4. The waveguide 1b is illuminated by ambient light 3. There is no scattering of ambient light, and photoluminescent 2b is not visible (indicated by dashed lines) when waveguide 1b is in the non-energized state. The OPV varnish applied to the emissive light displays of the present invention reduces the surface texture of the photoluminescent printed waveguides. The reduction in surface texture results in less, or no, scattering of ambient light, so that the non-energized printed photoluminescent layer becomes transparent.

Figure 4:
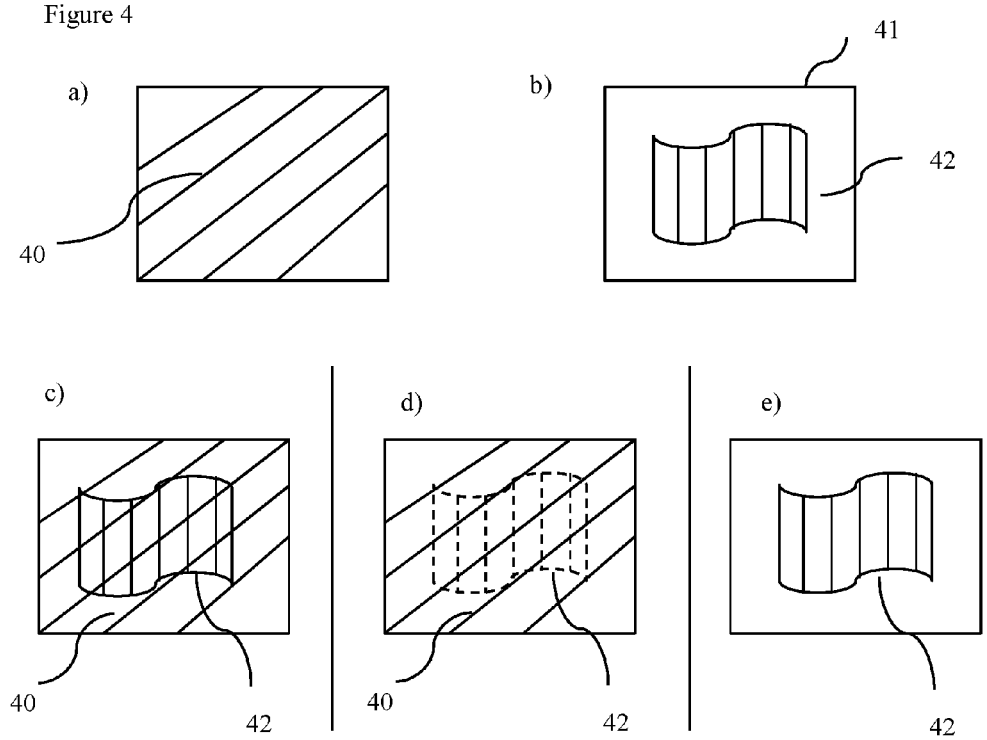
FIG. 4.

FIG. 4 further illustrates how an OPV applied to the surface of a waveguide renders the waveguide transparent. FIG. 4a shows an illuminated (light source not shown) background with a background pattern 40. The background must be illuminated by visible light to be visible to the observer. The background pattern 40 in FIG. 4a is a representation of what is seen by an observer when the illuminated background is viewed through a waveguide that contains no ink. FIG. 4b shows a waveguide 41, having printed thereon a photoluminescent image 42. For FIGS. 4c, 4d, and 4e, the background 40 is posterior to the waveguide 41 (configuration not shown). FIG. 4c is a representation of what is seen by an observer when viewing the background 40 through waveguide 41, when waveguide 41 is not coated with OPV, and is in a non-energized state. The observer sees background 40, and a faint, ghost image of photoluminescent image 42 on top of the background (indicated by solid lines). FIG. 4d is a representation of what is seen by an observer when viewing background 40 through waveguide 41, when waveguide 41 is coated with OPV and in the non-energized state. The observer sees only background 40. Waveguide 41 coated with OPV is transparent, and photoluminescent image 42 is not visible (indicated by dashed lines). FIG. 4e is a representation of what is seen by an observer when background 40 is not illuminated, and waveguide 41 is in the energized state. The observer sees only photoluminescent image 42. In certain embodiments, even when not illuminated, the background may be faintly visible due to light from the illuminated waveguide reaching the background. To further reduce the visibility of the non-illuminated background, and block the light from the illuminated waveguide, a light filter may be placed between the waveguide and the background, as described in US 2016/0231491.

In one embodiment of the present invention, a display system comprises one or more photoluminescent printed waveguides, and their associated light sources, and an edge lit or backlit transparency, also known as a translite, in the posterior position to the printed waveguides. The transparency in the posterior position provides a display element that can be illuminated for a very long time without significant color loss (i.e. long illuminated life). In addition, the transparency has the ability to support 100% white content. An example of a suitable translite is Duratrans®. To be visible, the translite must be illuminated by visible light. The illuminated translite is visible when the photoluminescent printed waveguides are in the non-energized state. However, the surface texture of the printed photoluminescent layer(s) reduces transparency of the printed photoluminescent layers, and creates the visual experience of distortion and opacity when viewing the translite layer. Application of an OPV to the waveguide according to the present invention eliminates the surface texture, rendering the waveguide transparent, so that the translite image is clearly seen. This is illustrated in FIG. 2. FIG. 2a illustrates printed graphic 20 (e.g. a Duratrans® translite) illuminated by visible light from a remote light source (not shown), having printed thereon an image 20a; and a non-energized waveguide 22, having printed thereon photoluminescent images 22a. The illuminated printed graphic 20 emits light 21. Light 21 reaching the surface of waveguide 22 is scattered, indicated by arrows 23. The scattered light reduces the transparency of non-energized waveguide 22, so that photoluminescent images 22a are faintly visible as ghost images (shown by solid lines) on top of the printed graphic image 20a when 20a is viewed through waveguide 22. FIG. 2b illustrates printed graphic 20 (e.g. a Duratrans® translite) illuminated by visible light from a remote light source (not shown), having printed thereon an image 20a; and non-energized waveguide 24, having printed thereon photoluminescent images 24a, and coated with an OPV 25, which reduces surface texture of the waveguide 24. The illuminated printed graphic 20 emits light 21. Light 21 reaching the surface of waveguide 24 is not scattered. The reduction in surface texture results in less, or no, scattering of light emitted from an adjacent illuminated graphic, so that the non-energized printed photoluminescent layer becomes transparent, and photoluminescent images 24a are not visible (indicated by dashed lines).

FIGS. 5 and 6 illustrate the visual effect provided by a display comprising an illuminated printed graphic translite, and a non-illuminated waveguide. FIG. 5a shows an illuminated translite 50 (light source not shown), having printed thereon an image 50a; and a waveguide 51, having printed thereon a photoluminescent image 51a. The illuminated printed graphic translite 50 is positioned posterior to the waveguide 51 (configuration not shown). The printed photoluminescent image produces a surface texture on the waveguide, so that the waveguide is not transparent. FIG. 5b is a representation of what is seen by an observer when viewing the illuminated graphic image 50a through the non-energized waveguide 51. The observer sees the illuminated printed graphic 50a, and the photoluminescent image 51a as a faintly visible ghost image on top of the illuminated printed graphic 50a. FIG. 6 shows an illuminated translite 50 (light source not shown), having printed thereon an image 50a; and a waveguide 52, having printed thereon a photoluminescent image image 52a, and coated with an OPV 53. The illuminated printed graphic translite 50 is positioned posterior to the waveguide 52 (configuration now shown). The OPV 53 eliminates the surface texture produced by the printed photoluminescent image 52a, and waveguide 52 is transparent. FIG. 6b is a representation of what is seen by an observer when viewing the illuminated graphic image 51a through non-energized waveguide 52. Because the OPV renders waveguide 52 transparent, the viewer sees only illuminated graphic image 50a.

Figure 3:
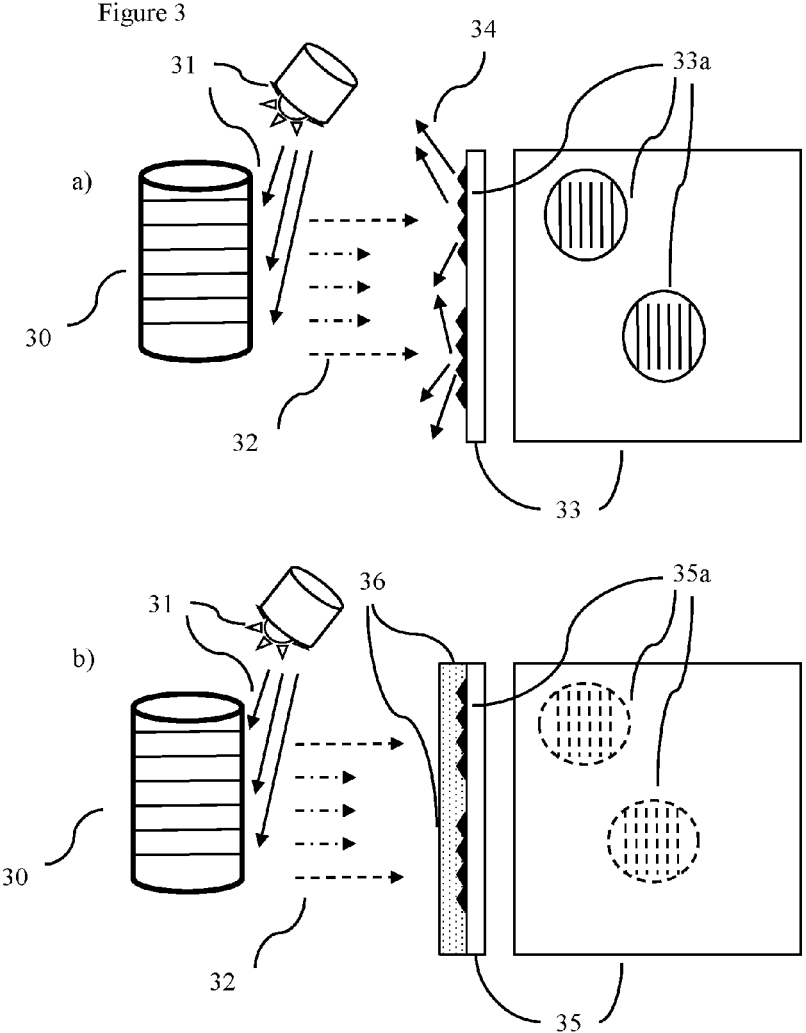
FIG. 3.
Figure 7:
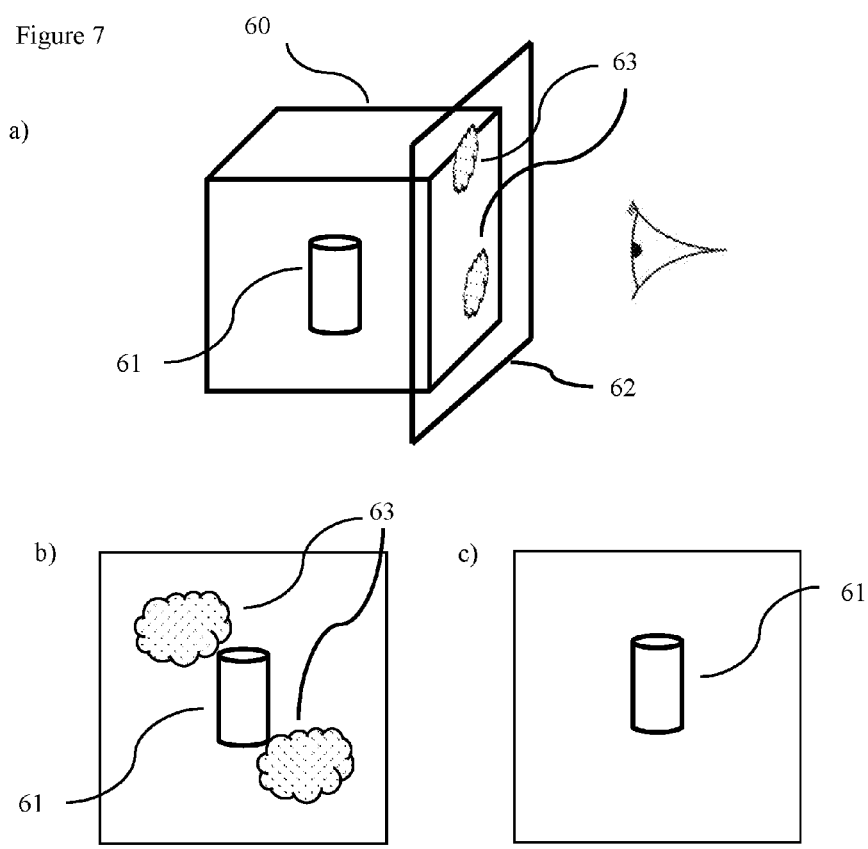
FIG. 7.

In another embodiment, the display system of the present invention comprises one or more photoluminescent printed waveguides, and a physical object posterior to the photoluminescent layers. Using photoluminescent layers to present imagery in front of one or more physical objects wherein the photoluminescent layers are largely transparent in the non-energized state such that the physical object(s) may be viewed in the background provides a compelling aesthetic presentation. However, the surface texture of the printed photoluminescent layer(s) reduces transparency, and viewing the physical object in the background is unappealing. Some examples of the physical object configuration include a cooler or freezer door, a shadow box or physical product glorifier, a transparent window display, or an alternating photoluminescent then transparent merchandising display. FIG. 3 illustrates this phenomenon. FIG. 3a illustrates physical object 30, illuminated by a remote visible light source 31; and a non-energized waveguide 33, having printed thereon photoluminescent images 33a. The illuminated physical object 30 emits light 32. Light 32 reaching the surface of waveguide 33 is scattered. The scattered light reduces the transparency of non-energized waveguide 33, so that photoluminescent images 33a are faintly visible as ghost images (shown by solid lines). FIG. 3b illustrates physical object 30, illuminated by a remote visible light source 31; and a non-energized waveguide 35, having printed thereon photoluminescent images 35a, and coated with an OPV 36, which reduces the surface texture of waveguide 35. The illuminated physical object 30 emits light 32. Light 32 reaching the surface of waveguide 35 is not scattered. The reduction in surface texture of waveguide 35 results in less, or no, scattering of light emitted from an adjacent illuminated physical object, so that the non-energized photoluminescent waveguide 35 becomes transparent, and photoluminescent images 35a are not visible (indicated by dashed lines). FIG. 7 is another illustration of the visual effect of viewing an illuminated object through a non-energized waveguide. FIG. 7a shows a box 60 containing therein an illuminated physical object 61 (light source not shown); and a non-energized waveguide 62 having printed thereon a photoluminescent image 63. FIG. 7b is a representation of what is seen by an observer when viewing the illuminated object 61 through non-energized waveguide 62, when waveguide 62 is not coated with OPV. The observer sees the illuminated object 61, and photoluminescent image 63 is faintly visible as a ghost image over the illuminated object 61. FIG. 7c is a representation of what is seen by an observer when viewing the illuminated object 61 through non-energized waveguide 62 when waveguide 62 is coated with OPV. OPV-coated waveguide 62 is transparent, and the observer sees only the illuminated object 61. In another embodiment, the display system of the invention comprises one or more photoluminescent printed waveguides, and a glass surface (e.g. a cooler or freezer door) posterior to the photoluminescent layers.

Figure 9:
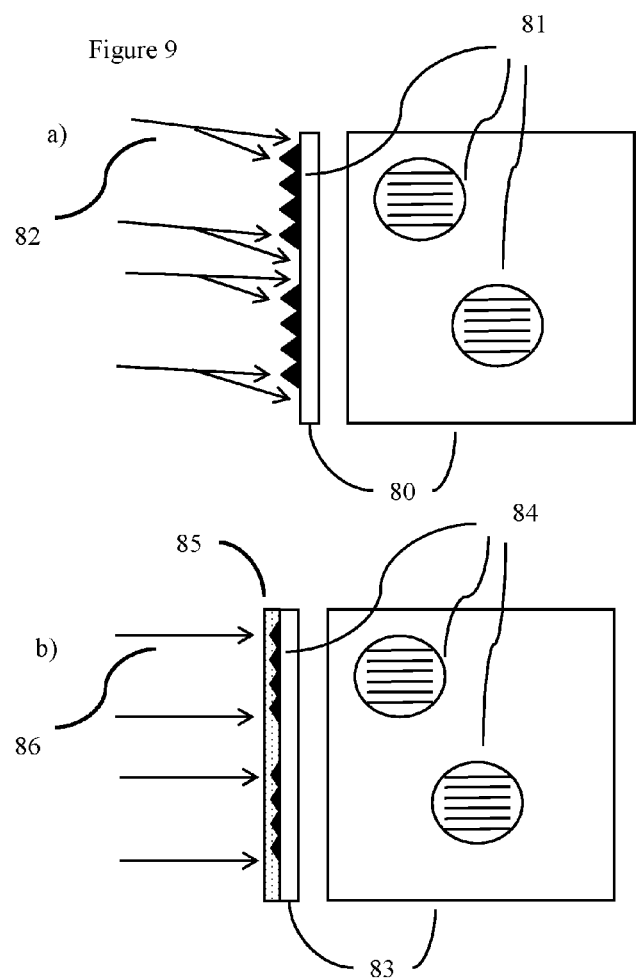
FIG. 9.

Emissive photoluminescent printed waveguides often suffer from visible surface geometry at the transition between a printed portion and a non-printed portion. That is, the top surface of the portions that are printed are higher than the surface of the waveguide. The uneven surface geometry results in visually noticeable artifacts, and the borders of the non-illuminated photoluminescent image may be seen as a ghost image on posterior images or objects, especially when thick coats of photoluminescent ink are applied and there is a sharp fall off of surface height at the border or margin of the photoluminescent printed image. That is, there is a visible height change at the ink/no ink border. Application of the OPV according to the present invention eliminates the surface geometry changes, and returns the printed substrates to what approaches a glassine surface. According to the present invention, an OPV is applied to a photoluminescent printed waveguide in sufficient thickness, viscosity, and dwell time, to ensure that the border transitions between the printed and non-printed portions of the waveguide are softened or smoothed, thereby eliminating visually recognizable surface height changes or transitions. This is illustrated in FIG. 9. FIG. 9a shows a waveguide 80, having printed thereon photoluminescent images 81. The photoluminescent ink creates a higher surface compared to the non-printed portions of the waveguide, and light 82 (arrows) hits the surface of the waveguide at different levels and times at the borders between the printed and non-printed portions of the waveguide, creating visible artifacts at the margin. FIG. 9b shows a waveguide 83, having printed thereon photoluminescent images 84, and coated with OPV 85, in a sufficient thickness that the surface of the OPV is above the surface of the features of the printed ink, creating a smooth surface on waveguide 83. Light 86 (arrows) hits the waveguide 83 which is smooth across all parts of the surface of the waveguide 83, creating a clear, transparent waveguide.

The surface texture of the printed waveguides can result in a high angle color shift when viewing photoluminescent graphics off axis. When there is high angle color shift, both the excited ink photoluminescence and the excitation light are emitted, and viewed by an observer. This results in the observer seeing the printed image taking on, for example, a purple tinge if the excitation light is violet. Application of an OPV to the waveguide according to the present invention creates a planar uninterrupted surface which eliminates the off-axis color shift due to physical ink dot structure. The observer then sees only the excited ink photoluminescence. FIGS. 10 and 11 illustrate this phenomenon. FIG. 10 shows a waveguide 90, having printed thereon a photoluminescent image 91. Waveguide 90 is illuminated by short wavelength light 92. The short wavelength light 92 (indicated by dashed arrows) propagates along inside waveguide 90, activating the phosphors of photoluminescent image 91. The activated photoluminescent image 91 emits visible light 93 from waveguide 90, making the photoluminescent image 91 visible to an observer. Because the photoluminescent printing 91 creates a surface texture on waveguide 90, when the photoluminescent image is viewed from an angle, the observer is also exposed to some of the energizing short wavelength light emitted (dashed arrows 92). FIG. 10b is a representation of what an observer sees when the image is viewed from a high angle through the waveguide. Because some of the short wavelength light is emitted, the observer sees photoluminescent image 91a, which is photoluminescent image 91 with a slight purple or blue tinge (indicated by dashed diagonal lines across the image). FIG. 11 shows a waveguide 100, having printed thereon photoluminescent image 101, and coated with OPV 102. Waveguide 100 is illuminated by short wavelength light 103. The short wavelength light 103 propagates along inside waveguide 100, activating the phosphors of photoluminescent image 101. The activated photoluminescent image 101 emits visible light 104, making the photoluminescent image 101 visible to an observer. The OPV 102 eliminates the surface texture from waveguide 100, therefore, even when viewed from a high angle, the observer is not exposed to any emitted short wavelength light. FIG. 11b is a representation of what an observer sees when the image is viewed from a high angle through the waveguide 100. Because no activation short wavelength light is emitted, the observer sees photoluminescent image 101 in the colors intended.

Figure 14:
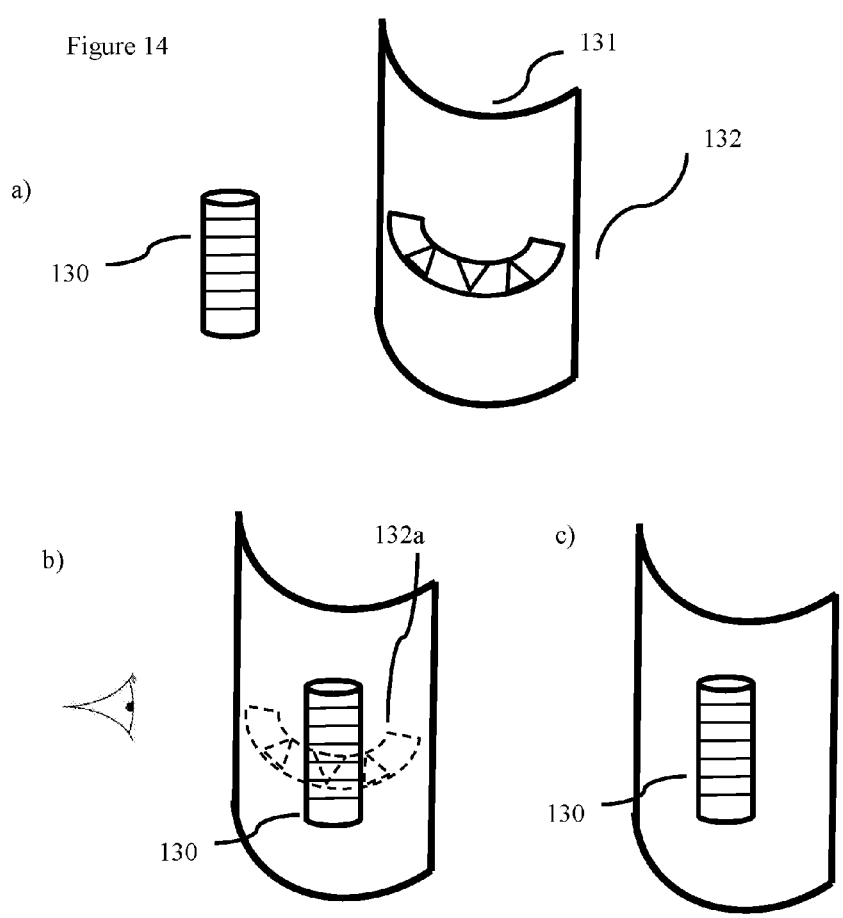
FIG. 14.

In certain embodiments, the photoluminescent printed waveguide is 3D, such as, for example, curved around a physical object. Therefore, 3D formed emissive photoluminescent printed waveguides which are coated with an OPV to improve transparency require a varnish which stretches without peeling, cracking, or discoloration during the thermoforming process. Thus, in a preferred embodiment the OPV of the present invention is thermoformable. This is illustrated in FIG. 14. FIG. 14a shows an illuminated object 130 (light source not shown), and a curved thermoformed waveguide 131, having printed thereon a photoluminescent image 132. The illuminated object 130 is placed posterior to the waveguide 131 (configuration not shown). FIG. 14b is a representation of what is seen by an observer when waveguide 131 is not coated with OPV, and is in the non-energized state; illuminated physical object 130 is visible, and photoluminescent image 132 is faintly visible as a ghost image, depicted as photoluminescent image 132a with dashed lines, in front of the illuminated object. FIG. 14c is a representation of what is seen by an observer when waveguide 131 is coated with OPV, and is in the non-energized state. The OPV makes waveguide 131, and the photoluminescent image 132 printed thereon, transparent, and the viewer sees only illuminated object 130.

In certain embodiments, the photoluminescent ink and OPV are applied to a thin film, such as a waterclear film. This clear film is then attached to a thicker waveguide (i.e. coupled to the waveguide). The clear film may be coupled to the thicker waveguide by lamination.

Photoluminescent inks often fade due to excitation such that useful life is greatly limited. The OPV of the present invention is compatible with the photoluminescent inks, and does not accelerate the fading. In addition, photoluminescent printed waveguides often use colorants that are sensitive to oxygen, and fade with exposure. In a preferred embodiment, the OPV provides an oxygen barrier over the photoluminescent inks, reducing exposure to oxygen, and thus alleviating the fading due to exposure.

Emissive photoluminescent printed waveguides which are coated with an overprint varnish to improve transparency benefit from a varnish that does not alter the color of the photoluminescent inks. One way in which an OPV may affect the colors of the photoluminescent image is that it interacts with the photoluminescent ink. Applying the OPV according to the present invention does not induce this interaction and color shift. The OPV is formulated such that when applied over photoluminescent inks, it does not exhibit intermolecular interaction that results in significant shift in the emitted photoluminescent colors. In particular, the OPV is formulated such that it does not aggressively penetrate the photoluminescent ink which may have already been partially cured/dried/fixed. The constituents of the OPV, particularly the photoinitiators, are chosen from ones that do not result in intermolecular color shift. In a preferred embodiment, the OPV does not shift the colors of the photoluminescent, or shifts the colors in a manageable fashion (corrected for shift).

With emissive phosphors, it is impossible to create darkness. Primary RGB colors combine to form white. Therefore, provision of a dark background for image contrast is needed. This background can be provided by a dark ambient background such as in a dimly lit room, or by placing a dark surface behind the photoluminescent printed layers, or by placing a light filter behind the photoluminescent layers. However, employing an overprint varnish on the photoluminescent layer(s) to reduce or eliminate surface texture can cause light emission in the graphic regions which should otherwise be dark. This can be caused by undesirable presence of fluorescence of the overprint varnish. This reduces contrast and degrades photoluminescent layer effectiveness. Thus, it is a preferred embodiment of this invention that the OPV contains minimal amounts of raw materials that fluoresce, and more preferably is free of raw materials that fluoresce. Examples of fluorescent materials to avoid using in the OPV varnish include, but are not limited to, the photoluminescent dyes listed above; fluorescent brighteners such as triazinylstilbene and 2,5-bis(5-tert-butyl-benzoxazol-2-yl-thiophene; quinones and anthraquinones; fluorenones; benzophenone; combinations thereof; and the like.

There are no absolute formulating requirements for the overprint varnish (OPV) used to produce the emissive displays of the present invention. For example, the OPV can be energy curable, solvent-based or water-based.

In a preferred embodiment, the OPV is energy curable. Any UV light source such as the following can be used; high-pressure mercury bulb, a medium-pressure mercury bulb, a xenon bulb, a carbon arc lamp, a metal halide bulb, a UV-LED lamp or sunlight, can be used. It should be appreciated by those skilled in the art that any UV light source may be used to cure compositions prepared according to the present invention.

OPV compositions that are energy curable may comprise any blend of free radically polymerizable monomers and/or oligomers.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2-(acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxybutyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3-methyl-1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate;

ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxyethyl)isocyanurate triacrylate; ε-caprolactone modified tris(2-hydroxyethyl)isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of monomers comprising UV polymerizable groups other than acrylate include N-vinyl amides. Suitable additional free-radically polymerizable monomers include, but are not limited to N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO). Vinyl ethers such as 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether, iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether(ODVE); 1-2-butanediol divinyl ether (BDDVE); 1-4,cyclohexanedimethanol divinyl ether (CHDM-di); hydroxybutyl vinyl ether (HBVE); 1-4-cyclohexanedimethanolmono vinylether (CHDM-mono); 1,2,4-trivinylcyclohexane (TVCH); vinylphosphonic acid dimethylester (VPA); or vinylphosphonic acid dimethyl ester (VPADME).

UV curing may also occur via a cationic mechanism. Suitable cationically curable monomers include, but are not limited to: oxetanes, such as 3-ethyl-3-hydroxymethyloxetane; 1,4-bis[(3-ethyl)-3-oxetanylmethoxy)methyl]benzene; 3-ethyl-3-phenoxyethyloxetane; and bis[{1-ethyl(3-oxetanyl)}methyl]ether; epoxides, such as allyl glycidyl ether; bis[4-(glycidyloxy)phenyl]methane; 1,3-butadiene diepoxide; 1,4-butanediol diglycidyl ether; butyl-glycidyl ether; tert-butyl glycidyl ether; cyclohexene oxide; cyclopentene oxide; and 1,2,5,6-diepoxycyclooctane; vinyl ethers, such as 1,4-butanediol divinyl ether; butyl vinyl ether; 1,4-cyclohexanedimethanol divinyl ether; cyclohexyl vinyl ether; and di(ethylene glycol) divynyl ether; and styrenes such as 4-acetoxystyrene; 4-benzhydrylstyrene; 4-benzyloxy-3-methoxystyrene; chlorostyrene; dichlorostyrene; 3,4-dimethoxystyrene; dimethylstyrene; and N,N-dimethylvinylbenzylamine; combinations thereof, and the like.

As well as, or in place of, free radically-polymerisable monomers and cationically-polymerisable monomers, any concentration and type of free-radically polymerisable oligomer or cationically-polymerisable oligomer, including but not restricted to polyurethane acrylates, polyester acrylates, polyether acrylates and epoxy acrylates may be used.

The radiation curable compositions of the present invention may further comprise inert, non-curable resins having no curable acrylic groups. The inert resins preferably have a number average molecular of about 1000 Daltons to about 30,000 Daltons. Preferably, the inert resins have a molecular weight of about 1000 to about 4000 Daltons. Examples of suitable inert resins include, but are not limited to, poly (acrylates), poly(ester), poly(urethanes), poly(amides), ketone resins, aldehyde resins, alkyd resins, phenol-formaldehyde resins, rosin resins, hydrocarbon resins, or mixtures of the aforementioned. Such resins improve pigment wetting, gloss, rheology and flexibility.

The radiation curable compositions of the present invention may contain, if cured by UV light, one or more photoinitiators.

Suitable photoinitiators include, but are not limited to α-hydroxyketones, acylphosphine oxides, α-aminoketones, thioxanthones, benzophenones, phenyl glyoxylates, oxime esters, acetophenones, benzil compounds and derivatives thereof, fluorenones, anthraquinones, combinations thereof, and the like. However, in preferred embodiments, photoinitiators that may be fluorescent, such as benzophenones, fluorenones, anthraquinones, and the like are not used in the OPV of the present invention.

Suitable α-hydroxyketone photoinitiators include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one; combinations thereof; and the like.

Suitable acylphosphine oxide photoinitiators include, but are not limited to: 2,4,6-trimethylbenzoyl-diphenylphosphine oxide; ethyl (2,4,6-trimethylbenzoyl)phenyl phosphinate; and bis-(2,4,6-trimethylbenzoyl)-phenylphosphine oxide; combinations thereof; and the like.

Suitable α-aminoketone photoinitiators include, but are not limited to: 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one; combinations thereof; and the like.

Suitable thioxanthone photoinitiators include, but are not limited to: 2-4-diethylthioxanthone, isopropylthioxanthone, 2-chlorothioxanthone, and 1-chloro-4-propoxythioxanthone; combinations thereof; and the like.

Suitable benzophenone photoinitiators include, but are not limited to: benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[−4-[benzoylphenylsulpho]phenyl]-2-methyl-2-(4-methylphenylsulphonyl) propan-1-one; combinations thereof; and the like.

Suitable phenylglyoxylate photoinitiators include, but are not limited to: phenyl glyoxylic acid methyl ester; oxyphenyl-acetic acid 2-[hydroxyl-ethoxy]-ethyl ester, or oxyphenyl-acetic acid 2-[2-oxo-2-phenyl-acetoxy-ethoxy]-ethyl ester; combinations thereof, and like.

Suitable oxime ester photoinitiators include, but are not limited to: 1-phenyl-1,2-propanedione-2-(O-ethoxycarbonyl)oxime; [1-(4-phenylsulfanylbenzoyl)heptylideneamino] benzoate, or [1-[9-ethyl-6-(2-methylbenzoyl)carbazol-3-yl]-ethylideneamino]acetate; combinations thereof; and the like.

Examples of other suitable photoinitiators include diethoxy acetophenone; benzil; benzil dimethyl ketal; titanocen radical initiators such as titanium-bis(ŋ 5-2,4-cyclopentadien-1-yl)-bis-[2,6-difluoro-3-(1H-pyrrol-1-yl) phenyl]; 9-fluorenone; camphorquinone; 2-ethyl anthraquinone; combinations thereof; and the like.

Polymeric photoinitiators and sensitisers are also suitable, including, for example: polymeric aminobenzoates (GENOPOL AB-1 or AB-2 from RAHN, Omnipol ASA from IGM or Speedcure 7040 from Lambson); polymeric benzophenone derivatives (GENOPOL BP-1 or BP-2 from RAHN, Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitiser Omnipol SZ from IGM.

An amine synergist may also be included in the energy curable inks and coatings suitable for use with the method of the present invention. Suitable examples include, but are not limited to aromatic amines, aliphatic amines, aminoacrylates and amine modified polyether acrylates.

Suitable cationic photoinitiators include, but are not limited to: triphenylsulfonium hexafluorophosphate; 4,4'-diemthyl-diphenyl iodonium hexafluorophosphate; 10-biphenyl-4-yl-2-isopropyl-9-oxo-9H-thioxanthen-10-ium hexafluorosphosphate; bis(dodecylphenyl)-iodoniumhexafluoro-antimonate; bis-(4-methyl-phenyl)-iodoniumhexafluorophosphate; bis-(($C_{10}$-$C_{14}$)-alkylphenyl)iodoniumhexafluoro-antimonite; bis-(4,4-dodecylphenyl)-iodoniumhexafluorophosphate; bis(4-tert-butylphenyl) iodonium perfluoro-1-butanesulfonate; bis(4-tert-butylphenyl)iodonium p-toluenesulfonate; bis(4-tert-butylphenyl)iodonium triflate; boc-methoxyphenyldiphenyldulfonium triflate; (4-tert-butylphenyl)diphenylsulfonium triflate; diphenyliodonium hexafluorophosphate; diphenyliodonium perfluoro-1-butanesulfonate; diphenyliodonium p-toluenesulfonate; diphenyliodonium nitrate; (4-iodophenyl)diphenylsulfonium triflate; (4-methylphenyl)diphenylsulfonium triflate; triarylsulfonium hexafluoroantimonate salts; triphenylsulfonium triflate; combinations thereof; and the like.

The radiation curable compositions and inks of this invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, silicones and organic polymer surfactants and inorganic materials such as talc. As examples, the Tegorad product lines (Tegorad are trademarks and are commercially available products of Tego Chemie, Essen, Germany) and the Solsperse product lines (Solsperse are trademarks and are commercially available products of Lubrizol company).

The radiation curable compositions and inks of this invention may contain the usual extenders such as clay, talc, calcium carbonate, magnesium carbonate or silica to adjust water uptake, misting and color strength.

The radiation curable compositions of the present invention can be UV-cured by an actinic light source, such as for example UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 mJ/cm$^2$, and more preferably within a range of about 50 to 500 mJ/cm$^2$. In addition, the bulb can be appropriately selected according to the absorption spectrum of the radiation curable composition. Moreover, the inks of this invention can be cured under inert conditions.

Alternatively, the radiation curable compositions and inks of this invention can be cured by electron beam (EB). Commercially EB-dryers are available for example from Energy Science, Inc. of Wilmington, Mass., or from Advanced Electron Beams Inc. (AEB) of Wilmington, Mass. The energy absorbed, also known as the dose, is measured in units of kiloGrays (kGy), one kGy being equal to 1,000 Joules per kilogram. Usually, the electron beam dose should be within the range of 10 kGy to about 40 kGy for complete curing. With the radiation curable composition of this invention a radiation dose of 20-30 kGy at an oxygen level of <200 ppm is usually sufficient to get a dry, solvent resistant coating or ink.

In some embodiments, the OPV of the present invention may be solvent-based. The solvent-based compositions typically comprise one or more binders, one or more solvents, and other additives to improve the properties of the coating.

In some embodiments, the solvent-based compositions comprise one binder. In other embodiments, the compositions comprise two or more different binders. Suitable binders include, but are not limited to, nitrocellulose-based resins, polyester-based resins, polyurethane-based resins, acrylic-based resins, polyamide-based resins, PVB-based resins (polyvinyl butyrate), styrene-based resins, combinations thereof, and the like. Other suitable binders include, but are not limited to, non-aqueous dispersions comprising one or more core-shell polymer-acrylates having core moieties selected from the group consisting of styrene, butyl acrylate, methyl methacrylate, hexyl acrylate, hexyl methacrylate, 2-ethylhexyl acrylate, 2-ethylhexyl methacrylate, acrylic acid, methacrylic acid; and shells comprised of, but not limited to, polyurethane resins, combinations thereof, and the like. A preferred resin is NeoRez U-475 polyurethane solution (DSM). Another preferred resin is UNI-REZ 2215 polyamide (Kraton).

Suitable organic solvents include, but are not limited to, aliphatic alcohols, esters, glycol ethers, glycol ether acetates, aliphatic alcohols, combinations thereof, and the like.

As with most ink and coating compositions, additives may be incorporated to enhance various properties. A partial list of such additives includes but is not limited to adhesion promoters, silicones, light stabilizers, de-gassing additives, ammonia, flow promoters, defoamers, antioxidants, stabilizers, surfactants, dispersants, plasticizers, rheological additives, waxes, silicones, etc.

The refractive index of the OPV is typically similar to the refractive index of the waveguide. The refractive index of the OPV may be slightly lower or slightly higher than the index of refraction of the waveguide. In a preferred embodiment, the index of refraction of the OPV is equal to or lower than the index of refraction of the waveguide material. For example, the index of refraction of the OPV is preferably about 1.1 to 1.9, to be similar to the refractive index of materials that are commonly used for waveguides. Matching of the index of refraction of the OPV to the waveguide material, or an OPV having a lower refractive index than the waveguide material, helps to maintain the TIR.

The OPV can be applied by any traditional coating or print technique, for example curtain coating, roll coating, slot die coating, inkjet, screen printing, flexographic, gravure, lithographic, etc. In a preferred embodiment, the OPV would be applied by a curtain coating, roll coating, slot die coating or inkjet process.

EXAMPLES

The following examples illustrate specific aspects of the present invention, and are not intended to limit the scope thereof in any respect and should not be so construed.

Example 1. Energy-Curable Overprint Varnish

The formulation of a non-limiting example of an inkjet UV curable overprint varnish is shown in Table 1.

TABLE 1

| Inkjet UV curable overprint varnish | |
|---|---|
| Material | wt % |
| Cyclic trimethylolpropane formal acrylate | 42.0 |
| Isobornyl acrylate | 15.0 |
| N-Vinyl Caprolactam | 33.4 |
| Hydroxycyclohexyl-phenyl ketone photoinitiator | 5.0 |
| Diphenyl-phosphine photoinitiator | 2.9 |
| Defoamer | 0.2 |
| phenolic primary antioxidant | 0.5 |
| siloxane copolymer flow/leveling agent and slip additive | 1.0 |
| Total | 100.0 |

This is an exemplary embodiment, and the precise formulation of the energy-curable OPV is not particularly limited, as long as it produces the desired effects.

Example 2. Sovent-Based Overprint Varnish

The formulation of a non-limiting example of screen print solvent-based varnish is shown in Table 2.

TABLE 2

| Screen print solvent-based overprint varnish | |
|---|---|
| Material | wt % |
| Cycloaliphatic epoxide | 45 |
| Aromatic polyester polyol | 13 |
| Limonene Dioxide | 15 |
| epoxidized polybutadiene | 10 |
| Triarylsulfonium hexafluorophosphate salt cationic photoinitiator | 5 |
| Dipropylene glycol dibenzoate plasticizer | 10 |
| Polyacrylate flow/leveling agent | 1 |
| Silicone-free polymeric defoamer | 1 |
| Total | 100 |

This is an exemplary embodiment, and the precise formulation of the energy-curable OPV is not particularly limited, as long as it produces the desired effects.

Example 3. Transparency of Overprint Varnish Illustrated by Clarity of Text

To test the transparency of the overprint varnish, two thin clear films (acrylic) were printed with a photoluminescent ink. One film was subsequently coated with a screen-printed OPV of the present invention, while the other film was not coated.

Printed text was viewed through each film, with the text being 15 cm behind the film. Text was printed at font sizes ranging from 8 point to 12 point font. The ability to visually resolve the text of various font sizes was used as a gauge of transparent quality. The smaller the font size that can be clearly read, the more transparent the film. For films that were not coated with OPV, a minimum font size of 12 point was generally necessary. For films that were coated with OPV, a font size as small as 8 point was easily read.

Figure 12:
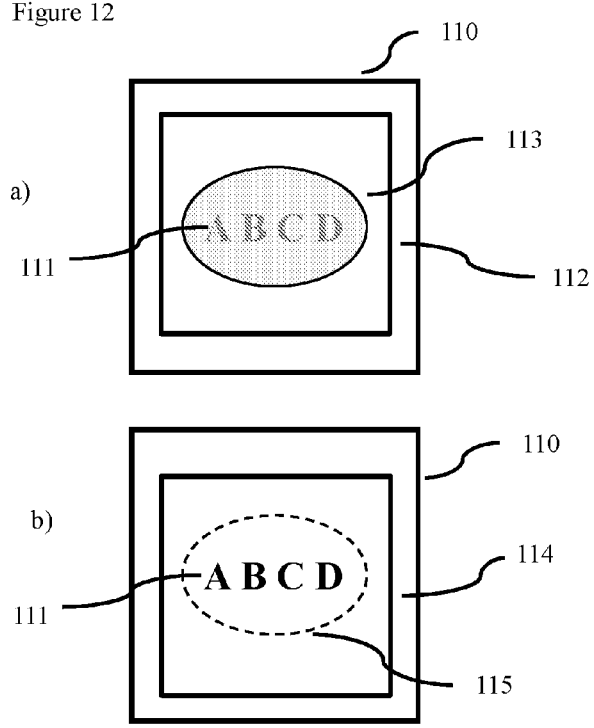
FIG. 12.

FIG. 12 is a representation of the results, wherein the text is blurred behind the uncoated film, and whereas the text is clear when viewed through the film coated with the OPV. FIG. 12a shows a printed graphic 110, containing text 111. Film 112 is held in front of printed graphic 110 with text 111. A photoluminescent image 113 is printed on film 112. The film 112 does not contain OPV. The film 112 is not transparent, and the photoluminescent image 113 is faintly visible (shaded oval with a solid outline) over printed text 111, making the text 111 blurry. FIG. 12b shows a printed graphic 110, containing text 111. Film 114 is held in front of printed graphic 110 with text 111. A photoluminescent image 115 is printed on film 114. Film 114 is coated with an OPV according to the present invention (not shown). The film 114 is transparent, and photoluminescent image 115 is not visible (indicated by an oval with no fill and a dashed outline). Text 111 is clearly seen behind film 114.

Example 4. Transparency of Overprint Varnish Illustrated by Clarity of a Background Pattern A textured background was placed behind a clear waveguide (acrylic). Three waveguides were tested: 1) waveguide with photoluminescent image only; 2) waveguide printed with a photoluminescent image and coated with an OPV according to the present invention; 3) an unprinted and uncoated waveguide (i.e. plain waveguide material). The background was viewed through each waveguide in the non-illuminated state. This is illustrated in FIG. 4.

FIG. 4a shows an illuminated (light source not shown) background with a background pattern 40. The background must be illuminated by visible light to be visible to the observer. The background pattern 40 in FIG. 4a is a representation of what is seen by an observer when the illuminated background is viewed through a waveguide that contains no ink. FIG. 4b shows a waveguide 41, having printed thereon a photoluminescent image 42. For FIGS. 4c, 4d, and 4e, the background 40 is posterior to the waveguide 41 (configuration not shown). FIG. 4c is a representation of what is seen by an observer when viewing the background 40 through waveguide 41, when waveguide 41 is not coated with OPV, and is in a non-energized state. The observer sees background 40, and a faint, ghost image of photoluminescent image 42 on top of the background (indicated by solid lines). FIG. 4d is a representation of what is seen by an observer when viewing background 40 through waveguide 41, when waveguide 41 is coated with OPV and in the non-energized state. The observer sees only background 40. Waveguide 41 coated with OPV is transparent, and photoluminescent image 42 is not visible (indicated by dashed lines). FIG. 4e is a representation of what is seen by an observer when background 40 is not illuminated (and optionally when a light filter placed between the waveguide and the background blocks light from the illuminated waveguide), and waveguide 41 is in the energized state. Only photoluminescent image 42 is visible.

Figure 13:
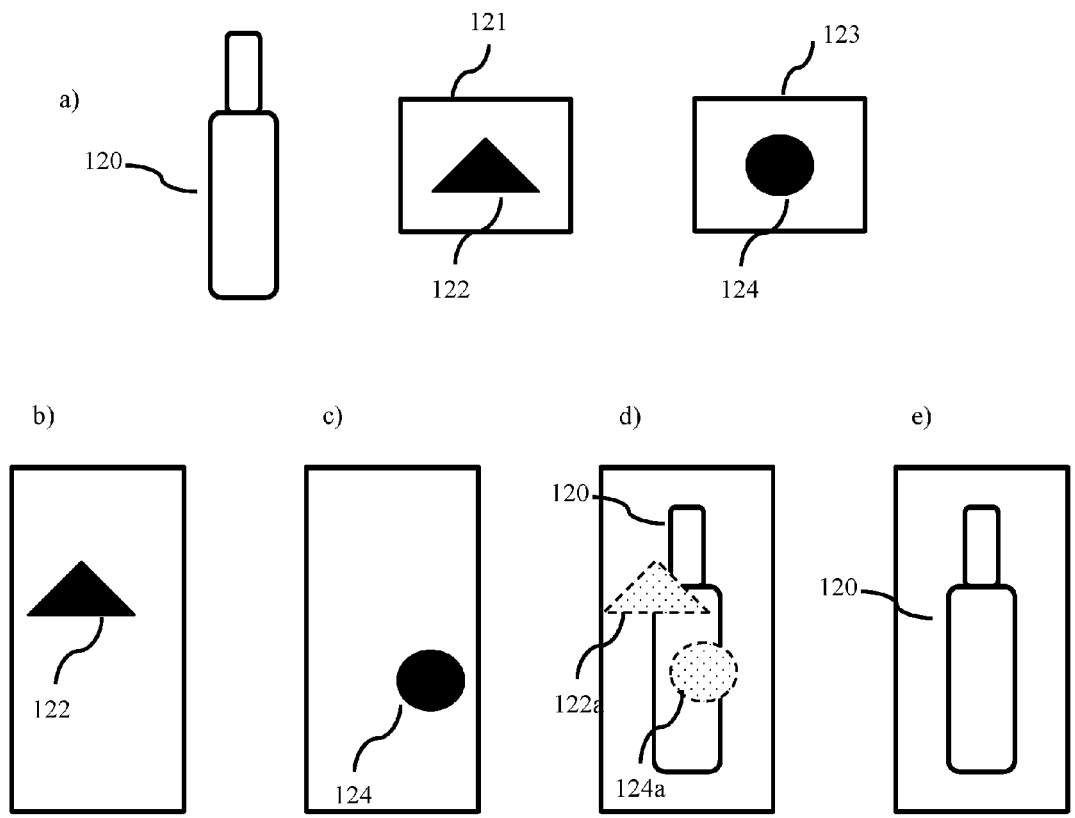
FIG. 13.

Example 5. Illuminated Physical Object Behind Two Photoluminescent Printed Waveguides A light emissive display containing a physical object (image 1) placed behind a first waveguide printed with photoluminescent image 2, and a second waveguide printed with a photoluminescent image 3. FIG. 13 is a representation of this example. FIG. 13a shows an object 120, which may be illuminated (illumination not shown), a waveguide 121 with a photoluminescent image 122, and a waveguide 123 with a photoluminescent image 124. The physical object 120 is placed posterior to waveguides 121 and 123 (configuration not shown). FIG. 13b shows what is seen by an observer when only waveguide 121 is energized (i.e. the physical object and waveguide 123 are not illuminated; and a light filter is optionally placed between the waveguides and the physical object 120): the observer sees only photoluminescent image 122. FIG. 13c shows what is seen by an observer when only waveguide 123 is energized (i.e. the physical object and waveguide 121 are not illuminated; and a light filter is optionally placed between the waveguides and the physical object 120): the observer sees only photoluminescent image 124. FIG. 13d shows what is seen by an observer when the physical object is illuminated, neither waveguide 121 nor waveguide 123 are energized, and when neither waveguide is coated with OPV; the illuminated object 120 is visible, and the photoluminescent images printed on waveguides 121 and 123 are faintly visible as ghost images 122a and 124a, respectively (indicated by dashed line images), on top of illuminated object 120. FIG. 13e shows what is seen by an observer when the physical object is illuminated, and neither waveguide 121 nor waveguide 123 are energized, but both waveguides are coated with OPV: the waveguides 121 and 123 are transparent, and only illuminated object 120 is visible.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A display comprising:
   a) one or more waveguides, each waveguide independently having a photoluminescent image printed thereon; wherein the photoluminescent image adds a surface texture to the waveguide, so that if the waveguide does not have a layer of OPV, the image is not transparent when the waveguide is in the non-energized state;
   b) one or more short wavelength light sources emitting excitation light, having a wavelength less than 450 nm, wherein each light source is associated with one waveguide, and adapted to transmit light through said waveguide, causing the photoluminescent image to emit visible light;
   wherein each waveguide comprises one or more layers of overprint varnish (OPV); and wherein the OPV eliminates the surface texture of the photoluminescent image and the waveguide, rendering the photoluminescent image and the waveguide transparent in the non-energized state.

2. The display of claim 1, wherein the OPV is substantially transparent.

3. The display of claim 1, wherein the printed photoluminescent images create a surface texture on the waveguides, and wherein the OPV applied thereon renders the regions with a surface texture substantially transparent.

4. The display of claim 1, wherein the OPV has a refractive index of 1.1 to 1.9.

5. The display of claim 4, wherein the OPV has a refractive index equal to or lower than the refractive index of the waveguide material.

6. The display of claim 1, wherein the OPV is thermoformable.

7. The display of claim 1, wherein the OPV is solvent-based or energy curable.

8. The display of claim 1, wherein the waveguide comprises one or more energy curable inks printed thereon, and wherein the energy curable OPV is cured simultaneously with the energy curable inks printed on the waveguide.

9. The display of claim 1, wherein the OPV is applied by screen printing, digital printing, flood coat, curtain coating, or roll coating.

10. The display of claim 1, further comprising a translite transparency having a graphic printed thereon, posterior to the one or more waveguides.

11. The display of claim 10, wherein the translite transparency is illuminated by a visible light source separate from the light sources used to illuminate the one or more waveguides.

12. The display of claim 1, further comprising a physical object posterior to the one or more waveguides.

13. The display of claim 12, wherein the physical object is illuminated by a visible light source separate from the light sources used to illuminate the one or more waveguides.

* * * * *